United States Patent Office 3,463,434
Patented Aug. 26, 1969

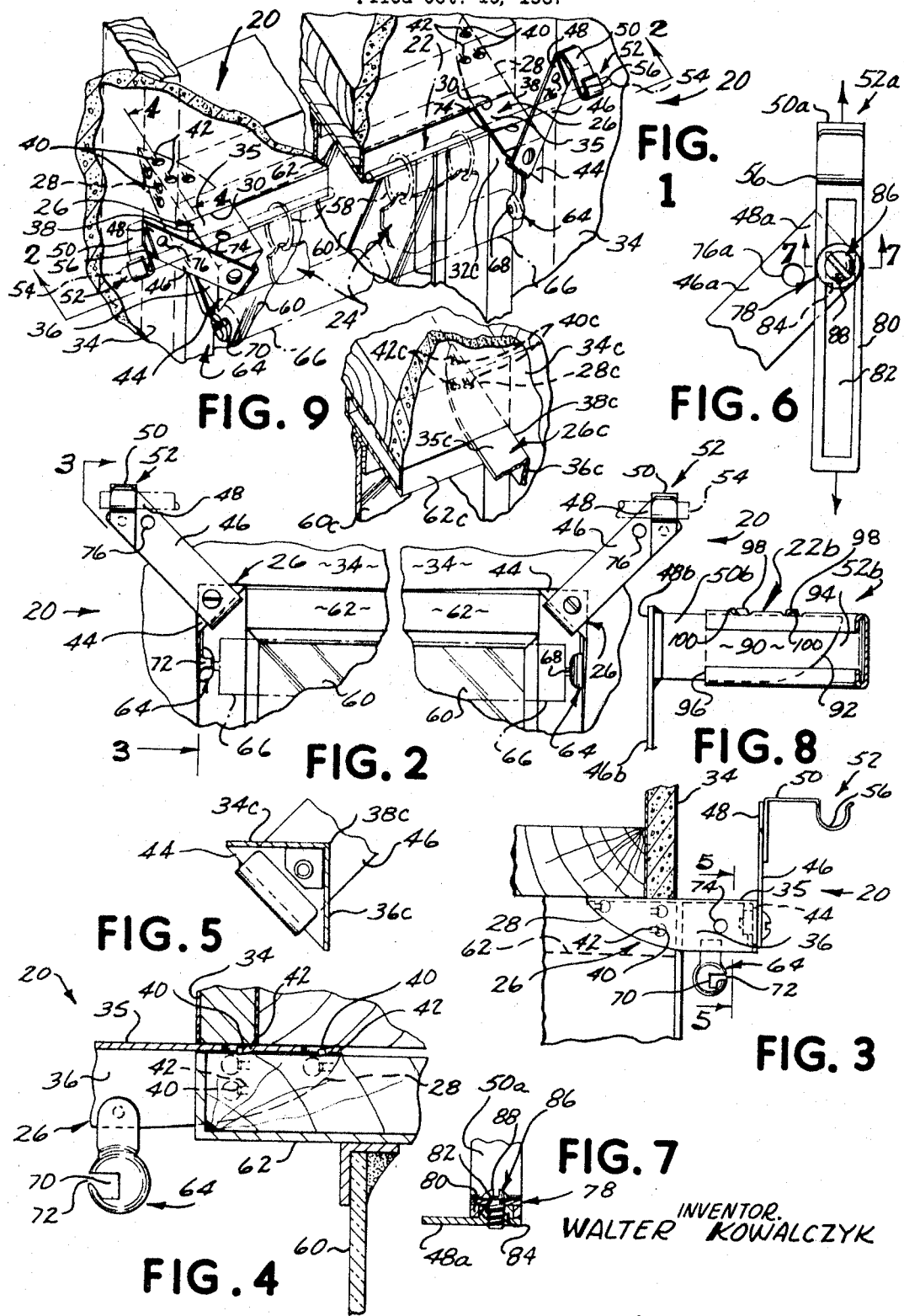

3,463,434
CURTAIN-ROD-MOUNTING OR TRAVERSE-
DRAPERY - ROD - MOUNTING BRACKET
APPARATUS
Walter Kowalczyk, 14647 Brest,
South Gate, Mich. 48192
Filed Oct. 19, 1967, Ser. No. 676,596
Int. Cl. A47h 1/14
U.S. Cl. 248—257                                    9 Claims

ABSTRACT OF THE DISCLOSURE

The specification discloses bracket apparatus which includes a mounting molding-strip-corner-engaging penetrating member having a rear end adapted to be forcibly driven into a junction region between a molding strip corner and a wall carrying same and having a forward end effectively provided with a forwardly-extending projection member having attached an engagement means cooperable for removable supporting attachment and engagement with respect to a corresponding portion of a horizontally directed supporting member, such as a curtain rod or a traverse drapery rod, in a position outwardly adjacent to a wall surface for use in supporting curtains, draperies, or the like, thereon.

Generally speaking, the present invention relates to bracket apparatus for mounting on a wall, adjacent to corners of a molding strip surrounding a selected wall area, such as that containing a window, for example, and where there is a junction region defined between each such molding strip corner and an adjacent portion of a wall carrying same—said adjacent portion of the wall carrying same often being made of plaster, although not specifically so limited. The novel bracket apparatus of the present invention is adapted to be driven into and penetrate into the junction region between such a molding strip corner and an adjacent wall portion in a manner which firmly mounts the bracket at said location with a connecting arm extending adjacent to the wall surface in an appropriate direction, usually upwardly, where it is provided with an outwardly directed projection member carrying an attachment and engagement means at the outer end thereof adapted for removably supporting attachment and engagement with respect to a corresponding portion (in one form, a corresponding end portion, although not specifically so limited) of a substantially horizontally directed supporting member, such as a traverse rod for mounting draperies or curtains thereon, or what is known in the prior art as a conventional curtain rod which normally is adapted to mount a curtain or a plurality of curtains thereon in a transversely slidable manner so that such draperies or curtains can be transversely moved therealong so as to hang in a desired position with respect to a wall surface or a window mounted in a wall. In the preferred form illustrated, each pair of brackets is provided with a blind-mounting member (each of which is slightly different, as will be detailed hereinafter) adapted to receive and mount a corresponding end portion of a conventional roller-type blind or shade (which is usually the spindle carried by the blind, one of which is rotative and spring-biased). One of the blind-mounting members is adapted to receive the conventional round end spindle member of the blind, and the other of said blind-mounting members is adapted to keyingly receive the conventional flat or otherwise keyed member projecting from the opposite end of a roller-type blind, which is usually connected to an inner biasing spring.

One major advantage of the present invention over prior art curtain rod brackets, traverse rod mounting brackets, or similar hardware, is the fact that it is completely self-contained — that is, that no additional mounting screws, nails, or the like, need be obtained in order to mount each bracket in operative relationship with respect to the junction region between a molding strip corner portion and the wall carrying same, as is frequently the case with prior art brackets and hardware intended for generally similar purposes. This is a major advantage, since in a conventional window mounting structure having a conventional molding strip mounted over and around a window opening in a wall, the molding strip is very often made of relatively soft wood which is easily split when fastening nails are driven thereinto or fastening screws are threaded thereinto for mounting such conventional prior art curtain rod brackets or traverse drapery rod brackets. This type of prior art damage to a prior art molding strip may require that it be repaired with "Plastic Wood," putty, or, in some cases, various other fillers or the like. However, in certain instances, the damage to a prior art molding strip produced by such fastening nails or screws may be such as to actually require replacement of the molding strip.

In connection with the above, it should be noted that the novel bracket apparatus of the present invention is particularly adapted for use where a window of the metal framed type (usually aluminum framed type) is mounted in a wall and where very small wooden molding strips are normally provided immediately outwardly adjacent to the metallic or aluminum frame carrying the glass windowpane. In such a prior art construction, the wooden molding strip outside of the metallic window frame may be only approximately ½ inch thick and perhaps of the order of 1½ inches wide, although the invention is not limited to use with this specific type of molding strip.

In such a prior art construction, it will be found that it is virtually impossible to mount a conventional prior art curtain rod bracket or traverse drapery rod mounting bracket on the relatively small wooden molding strip. In most cases, this produces very severe damage to the relatively small wooden molding strip and, in some cases, cannot be done at all. Therefore, it has been the prior art practice where such a construction is to have curtain rod brackets or traverse drapery rod brackets mounted, to fasten them by screws or the like to the plaster of the wall immediately outwardly adjacent to the relatively small wooden molding strip lying directly outside of the metallic window frame. This is also a relatively unsatisfactory arrangement, since plaster does not provide a very good material for holding the threads of the screws, and any load placed on the brackets will very likely pull the screws out of the plaster and produce such enlarged holes in the plaster that reattachment is impossible unless the holes are refilled with fresh plaster, putty, or the like.

The novel bracket apparatus of the present invention completely eliminates and overcomes the above-mentioned prior art problems and disadvantages where a metal-framed window-in-wall construction of the above-mentioned type is to be provided with such curtain rod brackets or traverse drapery rod mounting brackets. This is so since no fastening nails or screws are required to properly mount the brackets with respect to the wooden molding strip or with respect to the adjacent portions of the wall (usually plaster) and, thus, no damage of the above-mentioned prior art type, either to the molding strip or to the plastic wall, will occur.

The novel mounting bracket apparatus of the present invention is attached by driving the penetrating member thereof directly backwardly into the junction region between the outer periphery of the corner of the wooden molding strip and the adjacent part of the wall carrying the molding strip (which is usually made of plastic).

The penetrating member is not only driven rearwardly into said junction region to an extent such as to provide a very firm mounting for the bracket, but the bracket also includes a top engagement panel portion adapted to engage the corresponding top part of the molding strip corner and is also provided with a side engagement panel portion adapted to similarly engage a side part of the molding strip corner portion, thus providing very firm and solid support for the entire bracket and doing so in a manner which provides no exteriorly visible damage to either the molding strip corner or the adjacent portions of the wall and in a manner which requires no auxiliary or additional fastening elements such as nails or screws.

In some instances, it may be found that paint may have effectively covered the junction region between the molding strip corner portion and the adjacent part of the wall carrying same, and it may be necessary to first clear an open region therebetween to allow insertion of the penetrating member. This may be done by pushing a knife blade thereinto to definitely insure that there is an open region sufficiently large to receive the rear penetrating end of the penetrating member mounting the entire bracket.

It should also be noted that, in one form of the invention, the attachment and engagement means carried by the forwardly extending projection member of the bracket so as to be appropriately forwardly (and, in certain cases, upwardly and/or sidewardly) positioned with respect to the surface of the wall, is provided with vertical position adjustment means which makes it possible to adjust the position of the attachment and engagement means so as to correspondingly adjust the position of a traverse drapery rod or of a curtain rod adapted to be removably engaged and carried thereby. Of course, this requires that two of the brackets be so used at spaced locations along the wall and engage spaced portions, usually ends, of the rod so supported.

In one form of the invention, the attachment and engagement means is appropriately constructed for direct, simple, and easy receiving and supporting cooperation with a portion of a traverse rod, while, in another form thereof, it is so modified as to define a forwardly directed male engagement insert element adapted to be inserted into received and engaged relationship with respect to the conventional rearwardly directed female end connection portion of a conventional curtain rod which is normally provided with a transversely horizontally directed main intermediate curtain rod portion positioned between two such rearwardly directed female end connection portions thereof.

With the above points in mind, it is an object of the present invention to provide a novel drapery traverse rod or curtain rod mounting bracket apparatus for use in supporting draperies or curtains and requiring no auxiliary fastening elements such as nails, screws, or the like, for mounting same at the junction region of a molding strip corner and a wall carrying same, and which has any or all of the advantages referred to herein, including any or all of the features referred to herein, generically and/or specifically, and individually or in combination, and which is of extremely simple, inexpensive construction adapted to be manufactured at very low cost, both with respect to initial tooling cost and the cost of production per unit item, and which is virtually universally adaptable and wall mountable, particularly with respect to the mounting constructions conventionally surrounding metal framed glass windowpanes, although it is capable of being mounted with respect to any construction including a molding strip corner portion (frame, or other substantial equivalent) and an adjacent wall portion, whereby to be conductive to widespread use of the bracket apparatus for the purposes outlined herein and/or for any other substantially equivalent purpose.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, three exemplary embodiments are illustrated in the hereinbelow-described figures of the accompanying single drawing sheet and are described in detail hereinafter.

FIG. 1 is a reduced-size perspective view, illustrating a pair of brackets of one exemplary form of the present invention in mounted relationship with respect to the junction region between a pair of molding strip corner portions of a molding strip around a window in a wall and adjacent portions of the wall carrying same. What is known in the prior art as a traverse rod is shown in partially broken away form, mounted between the pair of brackets, and is adapted to carry thereon the upper edge of depending draperies, such as indicated fragmentarily in phantom in FIG. 1. A conventional roller-type window blind is also shown, in phantom mounted by the blind-mounting attachment members carried by each bracket. This view is laterally compressed for space-saving reasons by effectively removing central portions of the wall, molding strip, window, traverse rod, draperies, and roller-type window blind.

FIG. 2 is a fragmentary, somewhat diagrammatic and schematic, front elevational view of the apparatus of FIG. 1, including the pair of brackets mounted in the manner of FIG. 1 with respect to a pair of upper corner portions of the molding strip surrounding the window, but in this view the traverse rod, draperies, and roller-type window blind are all removed for reasons of drawing simplicity and clarity.

FIG. 3 is a fragmentary, staggered plane view, partly in elevation and partly in section, taken substantially along the multi-faceted plane indicated by the arrows 3—3 of FIG. 2.

FIG. 4 is an enlarged, fragmentary view taken substantially along the plane and in the direction indicated by the arrows 4—4 of FIG. 3.

FIG. 5 is an enlarged, fragmentary view, taken substantially along the plane and in the direction indicated by the arrows 5—5 of FIG. 3.

FIG. 6 is a fragmentary view similar to the upper right-hand corner portion of the connecting arm of the right-hand bracket carrying the attachment and engagement means of FIG. 2, but illustrates a modified form thereof which is positionally adjustable and lockable in any selected adjusted position.

FIG. 7 is an enlarged, fragmentary, sectional view, taken substantially along the plane and in the direction indicated by the arrows 7—7 of FIG. 6.

FIG. 8 is a fragmentary view, somewhat similar to the right upper portion of FIG. 3, but illustrates a modified type of attachment and engagement means which is adapted for engagement with respect to a conventional, rearwardly directed female connection portion of a conventional curtain rod so as to make a pair of this modified type of brackets capable of mounting a conventional curtain rod rather than a traverse drapery rod as shown in FIG. 1.

FIG. 9 is a fragmentary view similar to a portion of FIG. 1 but illustrates a very slightly modified form of the rear penetrating end of each bracket which is shown as being driven into the junction between a metallic window frame or molding strip rather than a wooden molding strip and the adjacent portion of the wall carrying same, thus showing that the device is not limited to use with a molding strip corner made of wood but may be mounted with respect to a molding strip corner (or frame) made of various different materials.

One exemplary form of the bracket apparatus of the present invention is indicated at two laterally spaced locations, generally designated by the reference numeral 20 in each instance. The arrangement is such that each bracket apparatus 20 of the pair thereof shown in FIG. 1 is appropriately transversely spaced from the other to effectively receive and mount a horizontally directed supporting member, such as is generally designated at 22 in FIG. 1, which may be said to substantially comprise what is usually known in the prior art as a traverse rod, which is adapted to slidably mount depending draperies, as generally designated by the reference numeral 24 and shown fragmentarily and in phantom in FIG. 1. However, it should be clearly understood that the invention is not specifically limited to bracket apparatus for mounting such a prior art traverse drapery rod but may also be slightly modified to mount a conventional curtain rod in the manner illustrated in FIG. 8, which will be described in greater detail hereinafter.

In the exemplary first form of the invention illustrated, each of the brackets generally designated at 20 is of similar construction (with the exception of the blind-mounting members which will be referred to hereinafter). However, each of the bracket members 20 is laterally positionally reversed in its construction from the other bracket member so as to be capable of cooperation with two different but positionally reversed molding strip corners or corner portions, as is clearly illustrated in FIG. 1. In view of the substantially identical construction of each of the bracket members 20 with the very minor exception and positional reversal feature noted above, only the left exemplary one shown in FIG. 1 will be described in detail hereinafter, although brief reference will be made to the slightly different construction of the right blind-mounting member carried by the right bracket 20 because of the above noted slight difference in the two different blind-mounting members of the two brackets 20. Therefore, in the detailed description of the exemplary and representative left bracket member 20 which follows, it should be understood that substantially the same description, considered as being transversely positionally reversed, is equally applicable to the right bracket member 20 shown in FIG. 1, except for the right blind-mounting member which will be referred to and separately individually described hereinafter.

The exemplary bracket apparatus 20, such as each of the two shown generally in FIG. 1, and illustrated in considerable detail in FIGS. 2–5, includes a substantially rearwardly directed mounting member, indicated generally at 26, which may also be said to comprise a molding-strip-corner-engaging member having a rear penetrating end 28 which is adapted to be driven into the junction region 30 between a molding strip corner or corner portion, designated by the reference numeral 32C, and the adjacent portions of a wall, indicated by the reference numeral 34, which in many cases may comprise a plaster wall, although the invention is not limited to being mounted at the junction region 30 between a molding strip corner portion 32C and a plaster wall only, such as indicated at 34. The rear penetrating end 28 of the penetrating mounting member 26 may be fastened in a manner similar to that illustrated in FIGS. 1 and 2 alongside of and in supported engagement with respect to a molding strip corner 32C which has positioned adjacent thereto any of a number of different types of walls 34 other than plaster. Also, the physical configuration and the extent of offset or the flush construction of the surface of the wall 34 with respect to the molding strip corner 32C may be substantially different from the showing of FIGS. 1 and 2 and yet be entirely suitable for appropriately mounting the rear penetrating end 28 of the mounting penetrating member 26 of each of the two brackets 20 in a manner generally analogous to the showing of FIGS. 1 and 2.

The mounting and penetrating member 26 of each bracket 20 includes a top engagement panel portion 35 and a side engagement panel portion 36 perpendicularly integrally connected by a corner junction 38 thereof. The arrangement is such that each top engagement panel 35 is adapted to engage the top part of the molding strip corner 32C, while each side engagement panel portion 36 is adapted to engage a corresponding side part of the corresponding molding strip corner 32C. This provides very firm support for each complete bracket 20 when mounted in the manner best shown in FIG. 1.

In the exemplary first form of the invention illustrated, each of the rear penetrating ends 28 of each mounting and penetrating member 26 is provided with what might be termed effectively one-way locking projections 40 adapted to allow the easy insertion of the corresponding rear penetrating end 28 into the junction region 30, but adapted to project inwardly into positive retaining and locking engagement with respect to the corresponding molding strip corner 32C which is shown as being made of wood and, thus, is soft enough to receive the projections 40 into the surface thereof. This substantially prevents the inadvertent and undesired removal of the fully inserted rear penetrating end 28 of either of the mounting and penetrating members 26 of the two brackets 20.

In the exemplary form illustrated, it should be noted that said one-way locking projections are integrally attached at their rear ends, as indicated at 42 in FIG. 3, and have free forward ends which are deflected or bent inwardly so that they function in the one-way locking manner described hereinabove.

Each such mounting penetrating member 26 has a forward end 44 provided with a substantially transversely directed connecting arm member 46 which extends in a plane substantially parallel to the surface of the wall 34 and which has an upper terminal end 48 provided with atits outer end attachment and engagement means, such as is generally designated by the reference numeral 52, and adapted for removable supporting attachment and engagement with respect to a corresponding end portion, such as shown in phantom at 54 in FIG. 1, of a horizontally directed supporting member such as the traverse drapery rod, indicated by the reference numeral 22, which is adapted to extend transversely substantially horizontally parallel to the surface of the wall 34 at a distance forwardly spaced therefrom to an extent substantially determined by the forward length of each of the projection members 50 of each of the brackets 20.

In the exemplary first form of the invention illustrated, each of said attachment and engagement means 52 effectively comprises a transversely directed, upwardly open receiving trough member 56 which is effectively fastened to (and, in fact, in the example illustrated, is formed in and is a part of) the corresponding outer end of the corresponding projection member 50, with the receiving trough member 56 of each of the two attachment and engagement means 52 carried by the projection members 50 of each of the two laterally spaced brackets 20 of FIG. 1, being similarly transversely directed toward each other in aligned relationship, so that the opposite ends 54 of the traverse rod member 22 can be vertically moved downwardly thereinto and engaged therewith (usually resiliently frictionally engaged therewith, although not specifically so limited) and held in such engaged relationship in the manner shown in FIG. 1. However, when the traverse rod 22 is to be removed from the attachment and engagement means 52, it is only necessary to forcibly move the ends 54 thereof upwardly out of the corresponding receiving troughs 56 until they become completely disengaged from each other. Such engagement and/or disengagement operations are, of course, necessary upon initially assembling the complete apparatus or upon disassembling same at any time and may facilitate the mounting of draper hooks or rings 58 thereon when draperies, such as shown fragmentarily in phantom at 24, are transversely slidably mounted thereon in depending relationship with respect thereto.

Incidentally, it should be noted that, in the exemplary first form of the invention illustrated in FIGS. 1–5, each of the connecting arms 46 is upwardly and outwardly directed in a plane substantially parallel to the inner surface of the wall 34. This is for the purpose of positioning each of the attachment and engagement means 52 in laterally aligned, forwardly spaced relationship with respect to the wall 34 at a pair of locations which are both above the top part of the molding strip indicated at 32 and, of course, above the window 60 and the metal window frame 62 carrying the glass pane of the window 60, and also positioned with a greater lateral separation between the two attachment and engagement means 52 than that provided by the complete width of the molding strip 32 surrounding the window 60 and the metal window frame 62. This is merely because it is conventional to mount draperies so that the upper ends thereof extend above the window and also extend laterally beyond the side edges of the window. However, it should be clearly understood that if any other type of positioning is desired, the connecting arm members 46 may be correspondingly modified as to shape and/or position, or made adjustable, all within the broad scope of the present invention.

In the exemplary first form of the invention illustrated in FIGS. 1–5, each of the mounting and penetrating members 26 is also provided with a blind-mounting member such as is generally designated at 64. In the example illustrated, each of said blind-mounting members 64, is attached to, and depends from, and, in certain cases, may comprise an integral part of, the corresponding side engagement panel portion 36 of the corresponding mounting and penetrating member 26 and depends therefrom into a proper position for mounting a conventional roller-type blind, such as is indicated generally in phantom at 66 in FIG. 1.

It should be noted that the right-hand blind-mounting member 64 defines a hole 68 adapted to rotatably receive a pivot pin or spindle such as is conventionally found at one end of a conventional roller-type blind, such as that shown in phantom at 66. However, the left blind-mounting member 64 carried by the left bracket 20 is very slightly different in that it discloses a keyed slot 70 having an entryway 72 extending thereinto and is thus adapted to receive the conventional keyed or flat tongue member of a conventional roller-type blind, such as is shown fragmentarily in phantom at 66 in FIG. 1, said tongue or keyed member being normally adapted to be connected to an inner biasing spring within the blind roller so as to apply an appropriate biasing force to the blind when extended and adapted to return same to partially or wholly rolled-up position when desired.

All of the structure just referred to with respect to the blind 66 is conventional and comprises no part of the present invention and is merely mentioned in order to clarify the reason for the very slight difference in the two blind-mounting members 64 comprising the provision in the right one thereof of the circular hole 68 and the provision in the left one thereof of the keyed slot 70 and entry opening 72.

It should be noted that, in certain forms of the invention where additional fastening engagement of the rear ends 28 of the mounting and penetrating members 26 of the two brackets 20 is desired, one or more screw holes may be provided such as shown at 74, to allow a screw or nail to enhance the engagement, and this may also be done, if desired, with respect to the screw hole 76 in each of the connecting arm members 46. However, this is merely done when an extremely strong mounting engagement is desired because of extremely heavy traverse rod and drapery means to be mounted by the pair of bracket members 20, perhaps in a manner having a very great lateral spacing therebetween which thus increases the loading on each bracket member 20.

FIGS. 6 and 7 illustrate a slight modification of a portion of the invention, and because it is a modification similar parts are designated by similar reference numerals, followed by the letter *a*, however. In this modification, controllably operable position adjustment means, indicated generally at 78, is provided to make it possible to adjust the position of the attachment and engagement means 52*a* into any selected position and to then lock the position adjustment means in the selected adjusted position.

In the exemplary form illustrated, said position adjustment means 78 comprises a vertical position adjustment means coupled to the terminal end 48*a* of a corresponding connecting arm member 46*a* and operable to allow vertical positional adjustment of the corresponding projection member 50*a* and the attachment and engagement means 52*a* and to then provide for the firm locking thereof in any such vertically adjusted position.

In the exemplary arrangement illustrated in FIGS. 6 and 7, the vertical position adjustment means 78 comprises a longitudinal vertical slot defining means, structure, or member 80 which may be said to comprise a longitudinal part of the projection member 50*a* and which defines the longitudinal vertical slot 82 therein which receives therethrough in an effectively keyed manner a keying mounting means or square or rectangular stud 84 carried by the upper terminus 48*a* of the connecting arm member 46*a* and, thus, providing for relative vertical slidable but non-rotatable movement of the longitudinal slot defining member 80 carrying the projection means 50*a* and the attachment and engagement means 52*a*.

The above arrangement makes it possible to vertically adjust the entire projection member 50*a* and attachment and engagement means 52*a* into any desired position and to then lock same in said adjusted position by the threaded locking means indicated generally at 86 and which comprises an exteriorly threaded screw 88 threaded into the keyed, square or rectangular stud 84. In other words, the screw 88 can be tightened, and this will lock the entire vertical position adjustment means 78 in whatever position of adjustment has been achieved prior to the tightening of the screw 88. This vertical position adjustment means 78 may be important in those forms of the invention where the over-all height of the draperies is desired to be adjusted relative to the actual molding strip corners which determine the position of each of the bracket apparatuses in the manner best shown in FIGS. 1 and 2, and thus the vertical position adjustment means 78 frees the interior decorator from the limitations with respect to height which might otherwise be imposed by the first form of the invention.

FIG. 8 illustrates a slight modification of the first form of the invention and, therefore, similar parts are designated by similar reference numerals, followed by the letter *b*, however. In this modification, it will be noted that each bracket, such as the one shown at 20*b*, is substantially the same as each bracket 20 of the first form of the invention, with the exception of the attachment and engagement means, designated at 52 in the first form of the invention and designated at 52*b* in the FIG. 8 modification of the invention, since it no longer comprises means for mounting a traverse drapery rod each as that shown at 22 in the first form of the invention, but, instead, comprises means for mounting a conventional curtain rod such as that shown at 22*b* in the FIG. 8 modification of the invention. Therefore, the modified attachment and engagement means 52*b* comprises a forwardly directed male engagement insert element 90 having a front insertion end 92 adapted to slip into the corresponding open end 94 of the rearwardly directed female end connection portion 96 of a conventional curtain rod such as that shown fragmentarily at 22*b*, which is provided with a transversely horizontally directed main intermediate curtain rod portion positioned between two such rearwardly directed female end connection portions, each similar to the one shown at 96 in FIG. 8, although, of course, being laterally positionally reversed.

In one preferred form, the male engagement insert element 90 is provided with an upwardly directed fastening pin or hook 98 adapted to extend through an engagement hole 100 in the female end connection portion 96 of the conventional curtain rod 22b, whereby to removably mount the entire curtain rod 22b in a substantially conventional manner. Otherwise, this modification of the invention is substantially the same as the first form of the invention and, in view of the detailed description of the first form of the invention set forth hereinbefore, no specific particularized description beyond that just set forth above of the FIG. 8 modification is thought necessary or desirable.

FIG. 9 illustrates the very slight modification of the first form of the invention and a slightly different mounting thereof with respect to a molding strip, or window frame corner, made of metal or the like, and because this is a modification, parts functionally or structurally similar to those of the first form of the invention are designated by similar reference numerals, followed by the letter c, however. It will be noted that, in this modification, the rear penetrating end 28c of each mounting member 26c extends inwardly between the junction of the metallic window frame (which might be called molding strip) 62c and the immediately outwardly adjacent portion of the wall 34c which in part may comprise a wooden framing member such as a two-by-four or the like, although not specifically so limited. Therefore, because of the different mounting of each of the rear penetrating ends 28c, the one-way locking projections 40 of the first form of the invention have been modified and, in the FIG. 9 form of the invention, may be outwardly directed rather than inwardly directed for engagement with an outside wooden framing member or portion of the wall 34c or optionally may be eliminated entirely in this modification of the invention. Otherwise, this modification of the invention is substantially the same as the first form of the invention, and in view of the detailed description of the first form of the invention set forth hereinbefore, no specific particularized description beyond that just set forth above of the FIG. 9 modification is thought necessary or desirable.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Bracket apparatus mountably cooperable with a junction region of a molding strip and wall carrying same for removably mounting a horizontally directed supporting member adapted to support curtains or draperies comprising: a mounting molding-strip-corner-engaging penetrating member having a rear penetrating end adapted to be forcibly driven into a junction region between a molding strip corner and a wall carrying same, said mounting molding-strip-corner-engaging penetrating member having a forward end effectively provided with a forwardly extending projection member, said projection member being provided with attachment and engagement means for removable supporting attachment and engagement with respect to a corresponding portion of a horizontally directed supporting member adapted to extend substantially transversely horizontally parallel to the surface of a wall and outwardly spaced therefrom a distance substantially determined by the forward length of each of said projection members attached and engaged with respect to corresponding portions thereof and adapted to support an upper edge of curtains or draperies thereon; said rear penetrating end of said penetrating member including a top engagement panel portion and a side engagement panel portion perpendicularly integrally connected by a corner junction thereof with said top panel portion being adapted to engage the top part of a molding strip corner and with said side panel portion being adapted to engage a side part of a molding strip corner, the forward end of said penetrating member being provided with a connecting arm member positioned between said forward end of said penetrating member and the forwardly extending projection member, said connecting arm member being adapted to lie immediately outwardly adjacent to and substantially parallel to the surface of the wall.

2. Bracket apparatus as defined in claim 1, including position-adjustment means effectively coupled between said forward end of said penetrating member and said attachment and engagement means and controllably operable to allow relative positional adjustment thereof and, consequently, of said attachment and engagement means, into a desired positionally adjusted relationship with respect to said penetrating member and operable for locking said position-adjustment means in said adjusted position.

3. Bracket apparatus as defined in claim 2, wherein said position-adjustment means comprises vertical slot-defining means carried by a longitudinal part of said attachment and engagement means and effectively keyed mounting means effectively mounted in a fixed relation with respect to the forward end of said projection member and vertically slidably and non-rotatably extending through said slot-defining means and threaded locking means associated therewith for frictionally locking same in any relatively vertically adjusted position with respect to said slot-defining means.

4. Bracket apparatus as defined in claim 1, wherein said attachment and engagement means defines a transversely directed upwardly open resilient receiving recess adapted to receive a corresponding portion of a transversely directed traverse rod in a downwardly engageable firmly supported manner therein and in an upwardly readily disengageable manner.

5. Bracket apparatus as defined in claim 1, wherein said attachment and engagement means defines a forwardly directed male engagement insert element adapted to be received and inserted into and hookingly engaged with respect to the rearwardly directed female end connection portion of a conventional curtain rod which is provided with a transversely horizontally directed main intermediate curtain rod portion between such rearwardly directed female end connection portions thereof.

6. Bracket apparatus as defined in claim 1, wherein said forward end of said penetrating member is provided with a blind-mounting member at a location such as to normally be positioned therebelow at a suitable location for the transverse mounting of the corresponding end of a conventional roller-type window blind.

7. Bracket apparatus as defined in claim 6, wherein said penetrating member is provided with one-way locking projections adapted to allow the easy insertion thereof into a junction region between a molding strip corner and an adjacent portion of a wall carrying same but adapted to project thereinto in a positive retaining and locking manner such as to substantially prevent the inadvertent and undesired removal of said inserted penetrating member from the junction region.

8. Bracket apparatus as defined in claim 1, wherein said penetrating member is provided with one-way locking projections adapted to allow the easy insertion thereof into a junction region between a molding strip corner and a wall carrying same but adapted to project inwardly into positive retaining and locking engagement with respect to a molding strip corner in a manner such as to substantially prevent the inadvertent and undesired removal of said inserted penetrating member from the mounted position thereof.

9. Bracket apparatus as defined in claim 1, wherein said engaging penetrating member is provided with one-way locking projections adapted to allow the easy insertion thereof into a junction region between a molding strip corner and a wall carrying same but adapted to project outwardly into positive retaining and locking engagement with respect to a part of a wall adjacent to the junction region in a manner such as to substantially prevent the inadvertent and undesired removal of said inserted penetrating member from the mounted position thereof.

References Cited

UNITED STATES PATENTS

| 909,353 | 1/1909 | White | 248—256 |
| 1,070,042 | 8/1913 | Kottkay | 248—257 |
| 1,643,061 | 9/1927 | Denney | 248—256 |
| 2,738,154 | 3/1956 | Mason | 248—255 |

ROY D. FRAZIER, Primary Examiner

J. FRANKLIN FOSS, Assistant Examiner

U.S. Cl. X.R.

248—216